United States Patent [19]

Jensen et al.

[11] Patent Number: 5,679,780
[45] Date of Patent: Oct. 21, 1997

[54] METHOD FOR OBTAINING HIGH-QUALITY PROTEIN PRODUCTS FROM WHEY

[75] Inventors: John Jensen, Hinnerup; Peter Henrik Larsen, Aarhus, both of Denmark

[73] Assignee: Tetra Laval Holdings & Finance S.A., Pully, Switzerland

[21] Appl. No.: 331,476

[22] PCT Filed: Apr. 29, 1993

[86] PCT No.: PCT/SE93/00378

§ 371 Date: Jan. 3, 1995

§ 102(e) Date: Jan. 3, 1995

[87] PCT Pub. No.: WO93/21781

PCT Pub. Date: Nov. 11, 1993

[30] Foreign Application Priority Data

May 7, 1992 [SE] Sweden ............................... 9201435

[51] Int. Cl.[6] .......................... C07K 1/34; C07K 14/47; C07K 14/79; A23J 1/20
[52] U.S. Cl. ................. 530/414; 424/41; 530/365; 530/394; 530/833
[58] Field of Search ........................ 530/365, 380, 530/386, 394, 414, 833; 426/41

[56] References Cited

U.S. PATENT DOCUMENTS

| | | | |
|---|---|---|---|
| 3,880,755 | 4/1975 | Thomas et al. | 210/91 |
| 5,149,647 | 9/1992 | Burling | 435/192 |

FOREIGN PATENT DOCUMENTS

| | | |
|---|---|---|
| 0022696 | 1/1981 | European Pat. Off. . |
| 0311283 | 4/1989 | European Pat. Off. . |
| 0320152 | 6/1989 | European Pat. Off. . |
| 0374390 | 6/1990 | European Pat. Off. . |
| 8911226 | 11/1989 | WIPO . |

OTHER PUBLICATIONS

Chemical Abstracts, vol. 97, No. 21, 22 Nov. 1982, Amundson, C.H. et al. "Production of Enriched Protein Fractions . . .".

*Primary Examiner*—Nancy Degen
*Attorney, Agent, or Firm*—Fish & Richardson P.C.

[57] ABSTRACT

High quality protein products are obtained from whey by subjecting whey to cross flow filtration in microfilter. The whey and retentate are brought to circulate in a circulation path on one side of the membrane area of the microfilter, while whey which has passed through the membrane area (permeate) is circulating in a second path on the other side of the membrane area in such a way that the pressure drop through the whole membrane area is kept constant and below 0.8 bar. With this technique, there is obtained a fractionation of milk serum protein such that denatured milk serum protein and fat are retained in the retentate and undenatured milk serum protein passes through the membrane into the permeate. With a subsequent treatment there is obtained a whey protein product which is rich is $\alpha$-lactalbumin and $\beta$-lactoglobulin and has a low fat content.

6 Claims, 1 Drawing Sheet

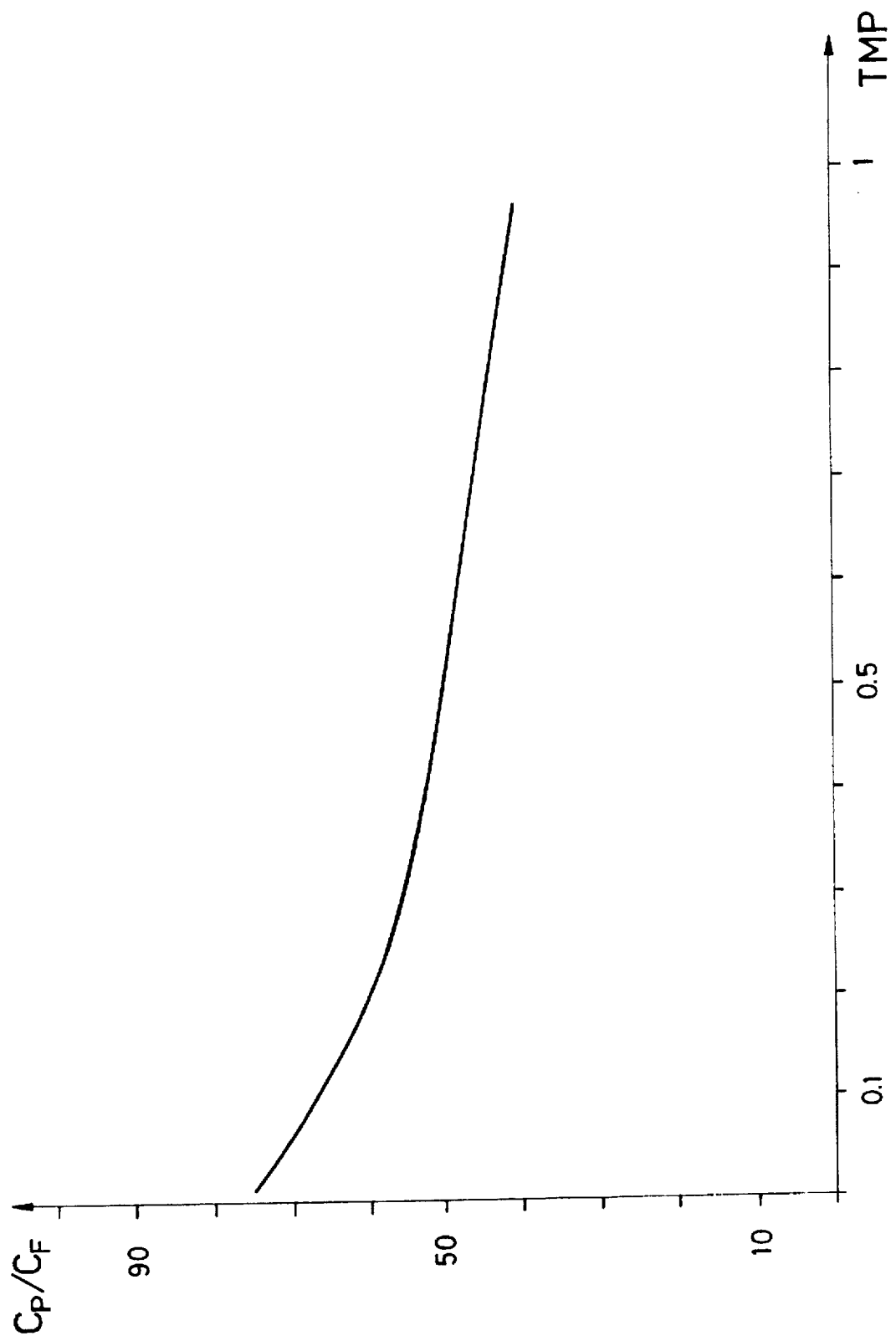

METHOD FOR OBTAINING HIGH-QUALITY PROTEIN PRODUCTS FROM WHEY

The present invention relates to a method of obtaining high-quality protein products from whey.

Whey constitutes the water part which is separated from the curd when producing cheese and casein conventionally. The whey amounts to 80–90% of the total amount of milk and contains about 50% of the nutrition in the milk i.e. soluble protein, lactose, vitamines and mineral substances. The dry solids content (TS) is ~6.3% where lactose is 4.85%, protein 0.8%, fat 0.5% and salts 0.7%.

Since cheeses were being produced on a larger scale it has been a problem to dispose of the whey. During a certain period the whey was discharged into lakes and water courses. Many countries have now forbidden such discharges. In order to make use of the nutrition in the whey to some extent it has been used as animal feed and as fertilizer.

For a long time the whey has been considered more as a troublesome by-product which must be taken care of than as a possible resource. During the latest years new processes for producing high quality whey products have been developed. By evaporation of the whey lactose may be obtained, at which the whey proteins firstly must be separated from the whey in many cases.

When whey is separated from the curd in connection with cheese production it contains small cheese fines which are separated, e.g in whey strainers. The cheese fines are used for manufacture of cheese-like products. After the separation of the cheese fines the main part of the fat in the whey may be taken care of in a centrifugal separator which also separates a further amount of cheese fines. After separation of fat the whey has a fat content of ~0.05% and may be treated further for example in ultrafilters. The proteins which are present in the whey are sometimes called whey proteins, sometimes milk-serum proteins and when the whey is separated from, the curd the proteins are dissolved in the whey. These proteins may be concentrated with different methods depending on among all if they are extracted in unaffected or heat denatured form. During the ultrafiltration substances with low molecular weight pass through the membrane in the ultrafilter and a concentrate is obtained. The permeate which is free from protein is an excellent raw material for production of lactose.

Depending on the degree of concentration (removal of liquid) different kinds of products are obtained. A product with 35% WPC (Whey Protein Concentrate) contains 35% protein of the total dry solids content. By a further concentration products with higher protein concent may be obtained as 60% WPC (60% protein). By way of diafiltration, i.e. addition of demineralized water followed by ultrafiltration, the protein content may be increased to 75–80% protein. A disadvantage is, however, that not only the protein is concentrated but also the fat, which gives protein products with a fat content of 6–7%.

Another method of taking care of the whey proteins is heat denaturation of the same, after which they are precipitated with acid. The proteins may then be concentrated, e.g. by means of a centrifugal separator. With this method 90–95% of the coagulated proteins may be recovered. Protein concentrate of this kind may for example be used as an additon to milk intended for producton of cheese.

Conversion of whey to valuable end products demands a starting material with a low bacterial content. In order to obtain such a material the whey has been purified by passage of a microfilter where bacteria and spores have been separated. If a microfilter with a pore size of 1.4µ is used 99% of bacteria and spores may be removed. The amount of retentate, i.e whey which has not passed the membrane area in the filter is 3–5% of the amount of supplied whey.

According to the invention it has now surprisingly been found that if the microfiltration of the whey is carried through under certain specified conditions, extremely high qualitative products may be obtained from the whey.

The microfiltration is carried through in a way known per se according to the invention by making supplied whey together with retentate to circulate in a circulation path on one side of the membrane areas while whey which has passed the membrane is brought to circulate in a second path. By controlling the pressure conditions the pressure drop over the whole membrane area may be kept constant. If the pressure drop over the membrane area is controlled in such a way that it is below 0.8 bar, a fractionation of the whey protein is obtained in such a way that denatured protein and fat are detained in the retentate while undenatured protein passes the membrane and is obtained in the permeate, at which after an end treatment there is obtained a whey protein product which is rich in α-lactalbumin and β-lactoglobulin and which has a low fat content.

In order to obtain a satisfactory fractionation the pore size in the membrane is 0.05–1.4µ, preferably 0.05–0.7µ.

The flow rate over the membrane area is with advantage 4–10 m/s, preferably 5–8 m/s.

The micro filtration is advantageously carried through in such a way that the pressure drop over the membrane area is below 0.2 bar.

As may be seen in the attached diagram of the relation between the content of true protein in supplied whey ($C_F$) and the content of true protein in the permeate ($C_P$), and the pressure drop over the membrane (TMP) the portion of true protein in the permeate increases with diminishing pressure drop. Through analyses it has been shown that it is the undenatured proteins that pass the membrane while denatured proteins and fat remain in the retentate. The mechanism which explains this fractionation is obscure, the explanation may possibly be that denatured protein is attracted and adheres to the membrane proteins in the membrane of the fat globules.

By working with a low pressure drop over the membrane area, which pressure drop is kept constant over the whole membrane area, i.e. over the available membrane area in the micro filter, the portion of true protein in the permeate may increase which means a higher yield of undenatured protein. The largest yield is obtained with a pressure drop close to zero.

According to the method of the invention it is possible to obtain operation periods of at least 20 hours with a constant capacity and constant passage of proteins by controlling the transmembrane pressure, which is of advantage if the whey for example is reconcentrated by ultrafiltration. The operation time for ultra filtration is usually 20 hours.

Without control of the transmembrane pressure micro filters usually must be cleaned after 8–10 hours.

The protein product with undenatured protein which is obtained according to the method of the invention has, when compared to whey protean products obtained in other ways, better solubility, gelatinizing capacity, viscosity, is a better emulgator and has in particular a better foaming ability, since the product has a low fat content.

EXAMPLE

Composition of whey and permeate after microfiltration according to the method of the invention:

|  | Pure protein | | Fat |
| --- | --- | --- | --- |
|  | Denatured % | Undenatured % | % |
| Whey | 0.12 | 0.48 | 0.05 |
| Permeate | <0.02 | 0.450 | <0.005 |

As may be seen in the table there is obtained a protein product with a considerably higher degree (90–95%) of undenatured protein according to the invention. After drying there is obtained a protein product rich in α-lactalbumin and β-lactoglobulin but with a low fat content (0.4%).

We claim:

1. In a method of obtaining high quality products from whey by cross flow filtration in a microfilter having a membrane with a pore size of 0.05 to 1.4μ, the improvement which comprises circulating a stream of whey and retentate containing denatured milk serum protein, non-denatured milk serum protein and fat on one side of said membrane, circulating permeate on the other side of said membrane and maintaining a constant pressure drop through said membrane at below 0.8 bar to obtain a fractionation of said stream with denatured milk serum protein and fat retained in said stream and undenatured milk serum protein passing into said permeate, to give a permeate rich in undenatured milk proteins.

2. Method according to claim 1, wherein the pore size in the membrane is 0.05–0.7μ.

3. Method according to claim 1, wherein the flow velocity over the membrane is 4–10 m/s.

4. Method according to claim 1, wherein the pressure drop through the membrane is below 0.2 bar.

5. Method according to claim 1, wherein the cross flow filtration in the micro filter is carried through with a operation time of at least 20 hours with a constant capacity and constant passage of protein by control of the pressure through the membrane.

6. Method according to claim 1 wherein the flow velocity over the membrane is 5–8 m/s.

* * * * *